United States Patent
Wroblewski et al.

[11] 3,769,534
[45] Oct. 30, 1973

[54] WHEEL SPEED SENSOR

[75] Inventors: Richard C. Wroblewski, Warren; Charles G. Wright, Detroit, both of Mich.

[73] Assignee: Rockwell International Corporation, Pittsburgh, Pa.

[22] Filed: June 16, 1972

[21] Appl. No.: 263,687

[52] U.S. Cl. .............................................. 310/168
[51] Int. Cl. .......................................... H02k 19/24
[58] Field of Search.................... 310/168, 155, 169, 310/151

[56] References Cited
UNITED STATES PATENTS
3,487,247   12/1969   Scheffler.............................. 310/168

Primary Examiner—D. F. Duggan
Attorney—John R. Bronaugh et al.

[57] ABSTRACT

A self-adjusting wheel speed sensor mechanism including a magnetic sensor and rotor on a vehicle axle and wheel, the sensor and rotor being automatically adjusted to a predetermined relationship as the wheel is mounted on the axle.

8 Claims, 4 Drawing Figures

WHEEL SPEED SENSOR

BACKGROUND OF THE INVENTION

Modern anti-skid control systems operate in response to electrical signals indicative of the angular velocity of one or more of the vehicle wheels. Usually these signals are derived from an electromagnetic sensor, including a magnet carried by a stationary portion of the vehicle such as the axle housing and a toothed, notched or slotted ring which rotates with the wheel opposite the magnet. As the ring teeth pass the magnetic sensor device, the resulting variations in flux produce a signal, the frequency of which is a function of the angular velocity of the wheel.

To produce the required accuracy of the velocity signal, the sensor and ring must be precisely located with respect to each other during and after assembly of the wheel on the axle. This must be done in a manner adaptable to mass production methods to minimize the need for skilled technicians and elaborate installation techniques. It is also essential upon reinstallation of the wheel after removal for repair that the sensor parts will be restored automatically to their preselected operating relationship. In addition, the velocity sensing unit must be protected against dirt, mechanical damage and heat.

Prior wheel speed sensor mechanicams which have attempted to satisfy these requirements generally have been quite complex and costly.

SUMMARY OF THE INVENTION

Accordingly, the primary object of this invention resides in the provision of a novel, self-adjusting, vehicle wheel speed sensor mechanism in which the rotating and stationary components of the mechanism are automatically adjusted to a predetermined precise relationship as the wheel is mounted on an axle.

Another object of the invention resides in the provision of a novel, self-adjusting wheel speed sensor mechanism which facilitates low cost installation of the sensor components and assures that the components are positioned and maintained in proper predetermined relationship to produce an accurate velocity signal.

A further object of the invention resides in the provision of a novel, self-adjusting wheel speed sensing mechanism in which the stationary and rotating sensing components are separately mounted on an axle and a wheel and then automatically adjusted to a precise predetermined relationship as the wheel is mounted on the axle. Consequently, the sensing components may be properly mounted on the axle and wheel, and the wheel may be rapidly installed on the axle by unskilled technicians employing routine installation techniques.

The novel wheel speed sensing mechanism of the invention attains these and other objects by providing a rotor component which rotates with the wheel and a magnetic sensor component mounted on the axle against rotation. The magnetic pickup sensor is mounted for free floating axial movement so that as the wheel is placed on the axle a radial face of the rotor component engages the opposing radial face of the sensor component to automatically shift and adjust the sensor component axially inwardly to a precise predetermined relative operating position so that an accurate velocity signal is produced. The engaging radial face of at least one of the components is coated with a dielectric material which automatically establishes a predetermined gap between the rotor and the sensor, the gap being maintained by one or more springs which bias the sensor into light contact with the rotor.

DETAILED DESCRIPTION OF THE INVENTION

Figure 1:
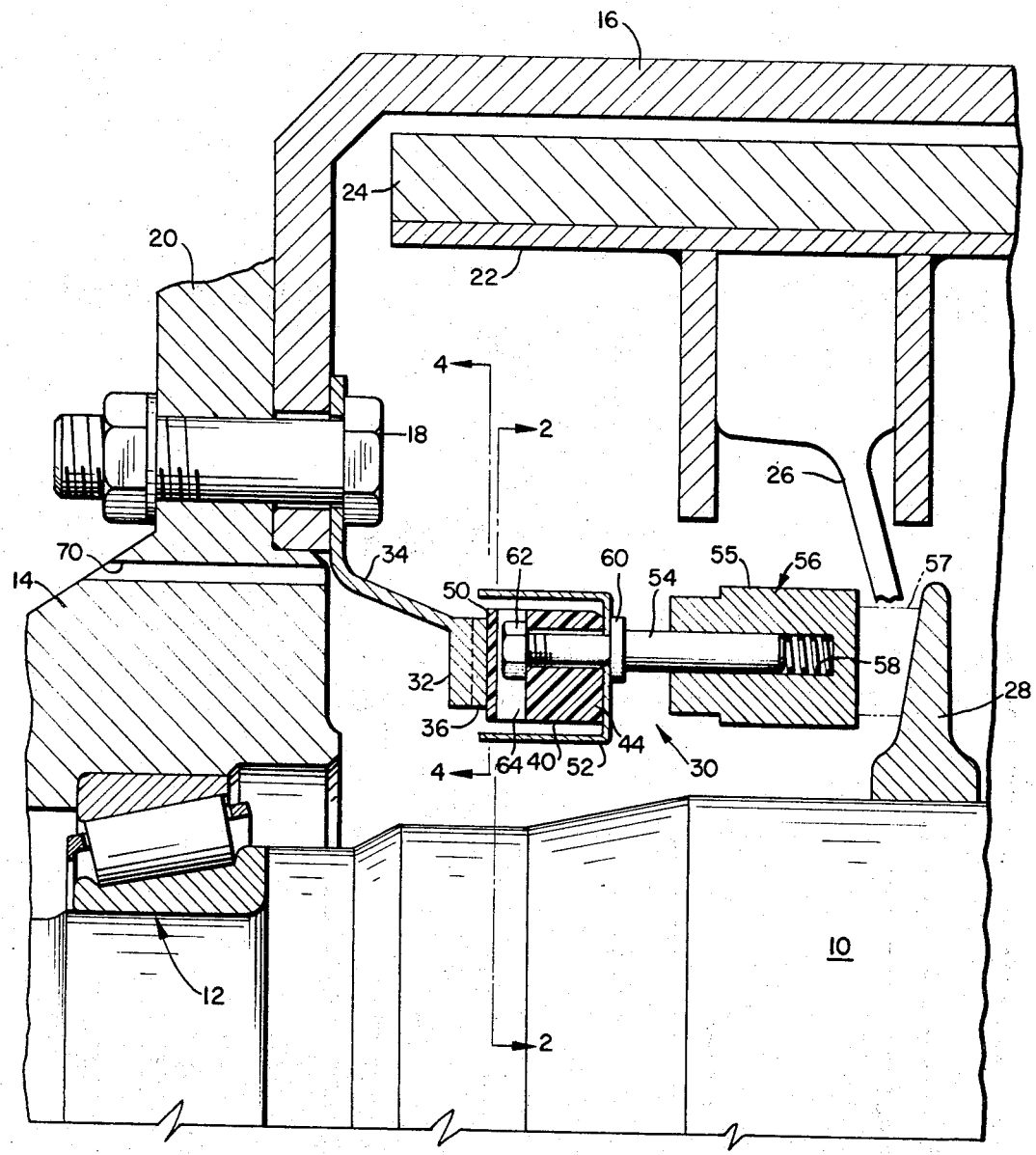
FIG. 1 is a fragmentary section showing a wheel sensor mechanism constructed in accordance with the present invention.
Figure 2:
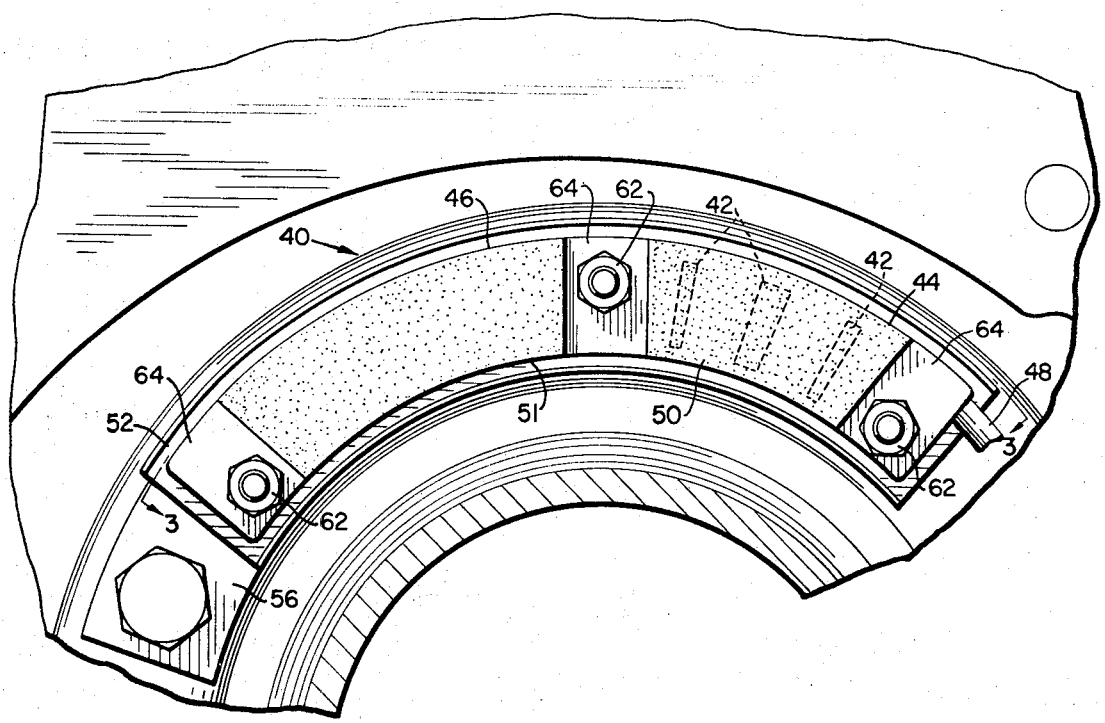
FIG. 2 is a fragmentary section taken generally along line 2—2 of FIG. 1 and illustrating the sensor unit which is mounted on the axle.
Figure 4:
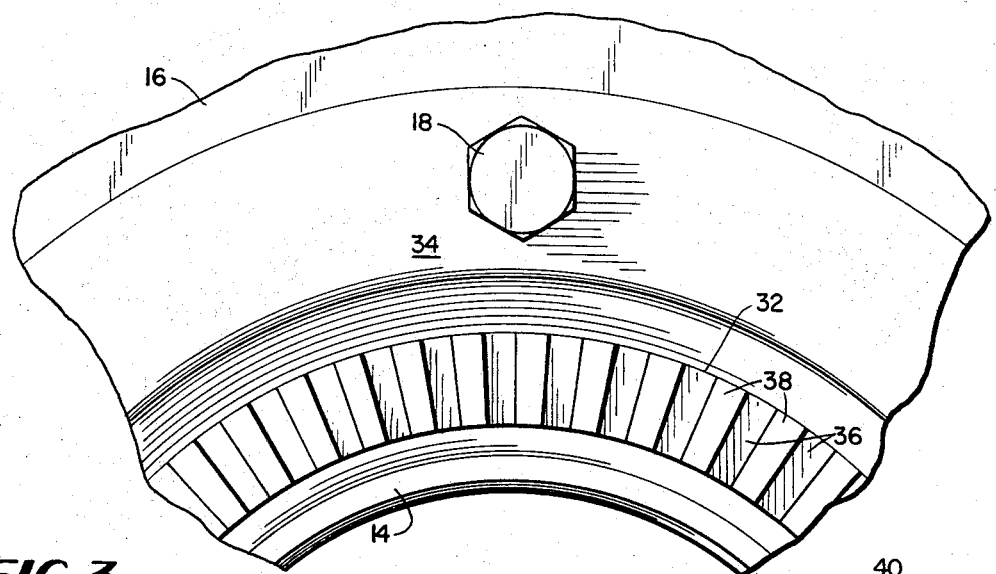
FIG. 4 is a fragmentary section taken generally along line 4—4 of FIG. 1 and illustrating the rotor component which is mounted on the wheel.
Figure 3:
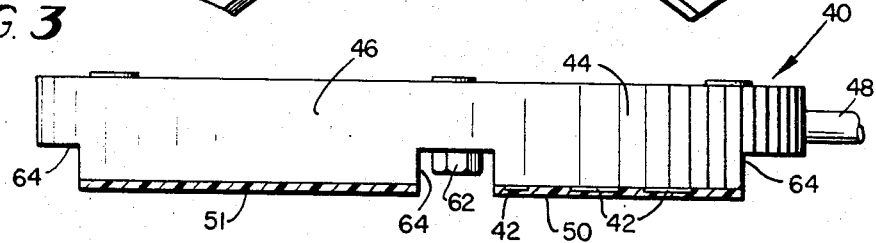
FIG. 3 is a plan view of the sensor unit taken generally along line 3—3 of FIG. 2.

For present purposes the invention will be disclosed as applied to a non-steerable vehicle axle, such as a trailer axle designed for heavy duty use. As used herein and in the claims, the term "axle" is intended to refer to any stationary component on which a wheel hub is mounted and includes components commonly referred to as spindles or hollow tubular housings which accommodate drive shafts if the wheels are to be driven.

Referring to the drawings, axle 10 is provided at its outer end with a bearing seat for bearing assembly 12 upon which wheel hub 14 is rotatably supported in the usual fashion. Brake drum 16 is connected by a plurality of bolts 18 to a radial flange 30 of hub 14, with flange 20 also carrying a plurality of wheel mounting studs which are not shown. The brake assembly is conventional and includes brake shoes 22 carrying linings 24 and a brake operating mechanism including an actuating arm which is shown schematically at 26 and is connected to a spider having a flange section 28 secured on axle 10.

Braring assembly 12 may be provided with lubricant from a cavity located adjacent its outer end and the inner end of the assembly will be sealed by a seal unit (not shown) carried between the wheel hub and axle.

The wheel speed sensor assembly 30 includes a rotor component formed by a steel ring 32 carried by a flared ring 34 is secured by bolts 18 on the wheel hub flange 20. On its inboard radial face, ring 32 has a plurality of equally circumferentially spaced teeth 36 and notches 38 therebetween. In a typical case, ring 32 will have an O.D. of 8.5 inches and will be provided with 100 equally spaced teeth 36 having a radial length of approximately 0.75 inches and a depth of approximately 0.125 inches.

Sensing assembly 30 also includes a magnetic sensor unit 40 which is of arcuate configuration and is formed on the same radius as the ring 30 and in a typical case may have a radial width of approximately one inch. Unit 40 includes a magnet assembly which may be of conventional construction having three poles 42 embedded in a plastic body portion 44 and a second housing portion 46 containing electric components (not shown) which convert the signals generated by the magnets to a proper form for use in the brake control system. The leads to the power supply for the sensor unit 40 as well as for the output signal are contained in a cable 48 leading into one end of the unit.

The outboard faces of sensor portions 44 and 46 are coated by gap pads 50 and 51, formed of a dielectric material such as an epoxy. As described hereinafter, pads 50 and 51 establish a predetermined axial gap or clearance between the ring teeth 36 and poles 42 of the magnet assembly. For example, the thickness of the pads covering poles 42 may be 1.060 inches.

As shown in FIG. 1, sensor unit 40 is protectively enclosed in an arcuate, channel-shaped shield 52 and is mounted for axial, shiftable movement by a plurality of pins 54 which are axially movable within a bracket assembly 56 carried by an adapter 57 suitably fixed to the spider 28. Each of the pins 54 is biased in the outboard direction by a light spring 58 located within bracket 56. Unit 40 and shield 52 are fixed on pins 54 between the pin collars 60 and a plurality of nuts 62 received within recesses 64 in the outboard radial face of the unit.

Proper operation of the wheel sensing assembly 30 is obtained only if the sensor unit 40 is precisely located with respect to the ring 32 so that a predetermined axial clearance or gap is provided between teeth 36 and magnet poles 42. This gap is automatically obtained by the described sensor assembly and its mounting arrangement.

Before assembling the wheel parts bracket 56 is fixed on axle 10 and sensor unit 40 and mounting pins 54 are slidably mounted on the bracket so that the outboard radial faces of gap pads 50 and 51 lie in a plane substantially perpendicular to the axis of axle 10.

Similarly, retainer ring 34 is connected to flange 20 of wheel hub 14 so that ring teeth 36 will lie in a radial plane substantially parallel to the radial faces of pads 50 and 51.

Springs 58 will bias sensor unit 40 in an outboard direction a sufficient distance so that, when wheel hub 14 is placed on axle 10, teeth 36 will engage the opposed radial faces of gap pads 50 and 51, and will displace unit 40 and pins 54 axially inwardly until wheel hub 14 is fastened in its set position on axle 10 as shown in FIG. 1. The compressed springs 58 continuously urge pins 54 and sensor unit 40 outwardly to maintain light engagement between teeth 36 and pads 50 and 51, and thereby maintain a precise predetermined gap between teeth 36 and magnets 42 of unit 40. Thus, due to the self-adjusting characteristic of sensor unit 40, installation of wheel hub 14 on axle 10 is readily facilitated since the precise clearance gap between the rotor teeth and sensor unit required for proper operation of the system is automatically obtained. This is also true following repair and reinstallation of a wheel hub by relatively unskilled technicians.

During operation of the vehicle, the sensor components are subjected to road shocks and constant vibration which may tend to displace unit 40 inwardly. However, springs 58 exert a sufficient force against pins 54 to maintain pads 50 and 51 in engagement with teeth 36 and thereby maintain the predetermined gap required for proper operation.

The sensor unit 40 is effectively shielded against heat and mechanical damage by the channel shaped shield member 52 and retainer ring 34. Retainer 34 may also act as a slinger ring to direct any excess oil that may leak past the seal of the bearing assembly 12 to one or more drain openings 70 which extend through the hub 14.

The invention may be embodied in other specific forms without departing from the spirit or essential characteristics thereof. The present embodiment is therefore to be considered in all respects as illustrative and not restrictive, the scope of the invetion being indicated by the appended claims rather than by the foregoing description, and all changes which come within the meaning and range of equivalency of the claims are therefore intended to be embraced therein.

What is claimed and desired to be secured by Letters Patent is:

1. A wheel speed sensor assembly for installation in association with a wheel rotatably mounted on an axle comprising a ring member having discontinuities on one radial face, said ring member being adapted to be connected to said wheel for rotation therewith with said discontinuities facing axially inwardly, a magnetic sensing assembly, and mounting means operatively securing said magnetic sensing assembly on said axle and permitting axial movement of said sensing assembly both outwardly and inwardly along said axle whereby said sensing assembly is automatically adjusted in predetermined relation with respect to said radial face of said ring in response to axial movement of said ring relative to said axle.

2. The assembly as defined in claim 1, said mounting means including spring means permitting axial displacement of said sensing assembly and biasing said sensing assembly toward said one radial face of said ring member.

3. The assembly as defined in claim 1, said mounting means including bracket means connected to said axle, at least one mounting pin connected to said sensing assembly and axially slidably mounted on said bracket means, and spring means on said bracket means for biasing said sensing assembly toward said one radial face of said ring member.

4. The assembly as defined in claim 1, wherein a layer of dielectric material is provided on at least a portion of the radial surface of said sensing assembly which faces said one radial face of said ring member, said layer of dielectric material being engaged by said one radial face of said ring member when the wheel is mounted on the axle.

5. The assembly as defined in claim 1, comprising stationary shield means positioned adjacent to said sensing assembly.

6. The assembly as defined in claim 1, comprising annular retainer means for connecting said ring member to said wheel.

7. A wheel speed sensor assembly for installation in association with a wheel rotatably mounted on an axle comprising a ring member having discontinuities on one radial face and being adapted to be connected to said wheel for rotation therewith with said discontinuities facing inwardly, a self-adjusting magnetic sensing assembly, means for mounting said magnetic sensing assembly on said axle, said mounting means permitting axial displacement of said sensing assembly both outwardly and inwardly along said axle and including spring means for biasing said sensing assembly toward said one radial face of said ring member, and a layer of dielectric material on at least a portion of the radial surface of said sensing assembly which faces said one radial face on said ring member, said layer of dielectric material being engaged by said one radial face of said ring member to cause said sensing assembly to be automatically axially adjusted with respect to said ring member in response to axial movement of said ring relative to said axle.

8. The assembly as defined in claim 7, comprising shield means positioned adjacent said sensing assembly.

* * * * *

PO-1050
(5/69)

UNITED STATES PATENT OFFICE
CERTIFICATE OF CORRECTION

Patent No. 3,769,534          Dated October 30, 1973

Inventor(s) Richard C. Wroblewski, Charles G. Wright

It is certified that error appears in the above-identified patent and that said Letters Patent are hereby corrected as shown below:

Column 2, Line 31, delete "30" and substitute --20--.

Line 39, delete "Braring" and substitute --Bearing--.

Column 4, Line 1, delete "invetion" and substitute

--invention--.

Signed and sealed this 19th day of November 1974.

(SEAL)
Attest:

McCOY M. GIBSON JR.          C. MARSHALL DANN
Attesting Officer           Commissioner of Patents